J. W. MOONEY.
CALCULATING DIVIDERS.
APPLICATION FILED JUNE 5, 1918.
1,300,221.
Patented Apr. 8, 1919.
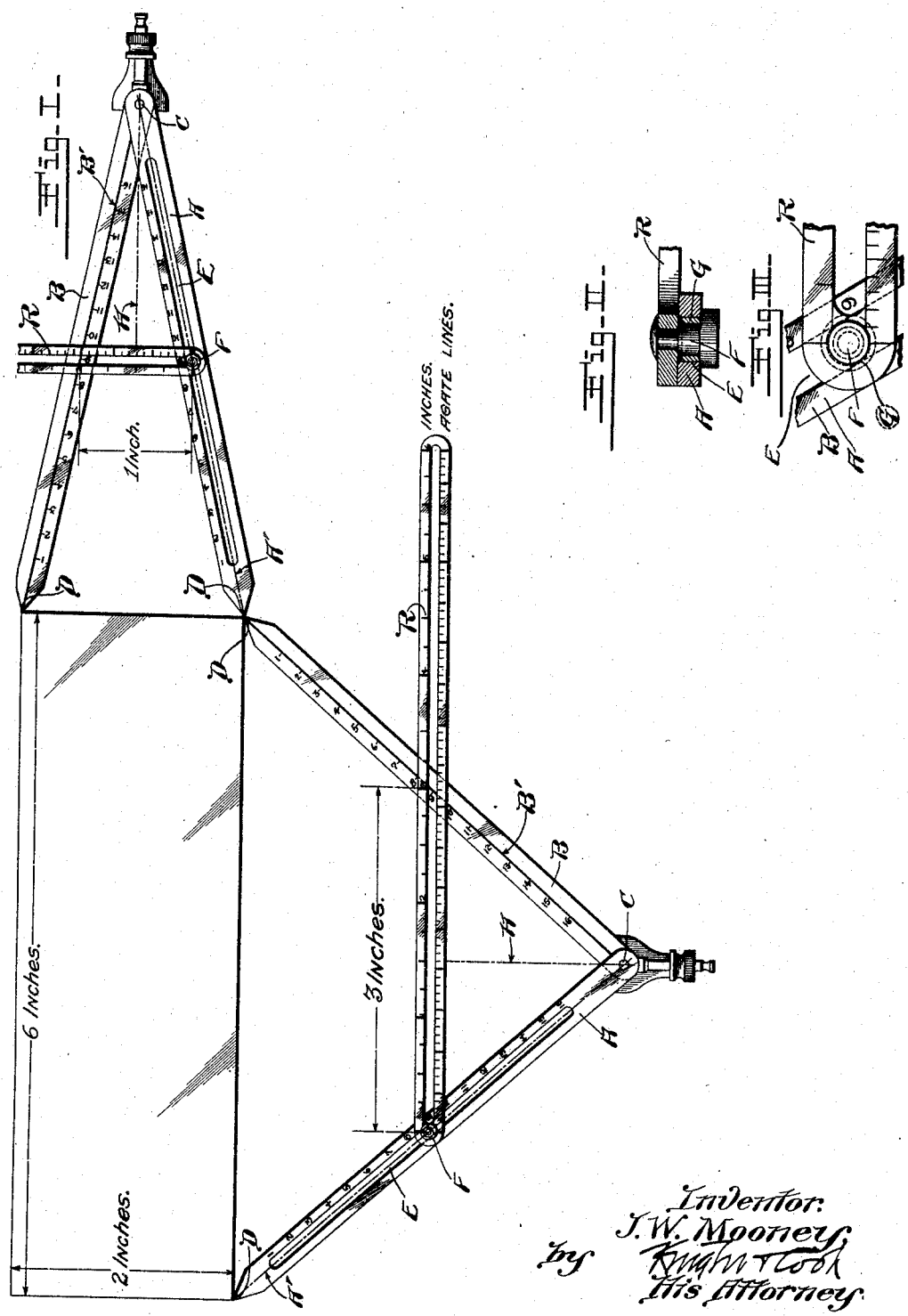

UNITED STATES PATENT OFFICE.

JOSEPH W. MOONEY, OF ST. LOUIS, MISSOURI.

CALCULATING-DIVIDERS.

1,300,221.  Specification of Letters Patent.  Patented Apr. 8, 1919.

Application filed June 5, 1918. Serial No. 238,388.

*To all whom it may concern:*

Be it known that I, JOSEPH W. MOONEY, a citizen of the United States of America, a resident of the city of St. Louis, State of Missouri, have invented certain new and useful Improvements in Calculating-Dividers, of which the following is a full, clear, and exact description, reference being had to the accompanying drawing, forming a part of this specification.

This invention relates to improvements in calculating dividers, and more particularly to an instrument adapted for use in calculations involving ratio and proportion, such for example as 6 is to 3 as 2 is to $x$. It will, of course, be understood that this is merely an illustration of a very simple example, and that the greatest value of the new device lies in similar calculations wherein the problem is rendered more difficult on account of fractions, or by reason of peculiar differences between the terms of the problem. The system of calculation is similar to "the rule of three" in arithmetic, the three known terms as well as the missing one being proportional.

Problems of this kind very frequently arise in the work of printers, engravers and others engaged in similar industries, wherein drawings, printed matter, and the like, are reduced or enlarged. In such cases, the two important dimensions of the drawing, or the like, are known; one of the dimensions of the enlargement or reduction is also known, and it is necessary to predetermine the other dimension. For example, if a drawing 6 inches x 2 inches is to be reduced by photography so as to make a "cut" 3 inches long, it may be necessary for the width of the "cut" to be known by one or more of many persons, including the customer, an estimator in the engraving or advertising department where the "cut" is to be used, and a printer who must set type to fill a given space wherein the "cut" is to be located. In actual practice I have found that much time and labor is spent in solving complex problems of this kind, and that losses are frequently incurred by mistakes, especially when the work is done hurriedly, or as is frequently the case by a person unfamiliar with a short method of obtaining the missing dimension.

Therefore, the main object of the present invention is to produce a simple instrument whereby problems in proportion can be easily, quickly and accurately solved without resorting to the rule of three, and without involving the use of a knowledge of arithmetic.

Another object is to facilitate photographic work by using arbitrary characters, as will be hereinafter pointed out, to indicate different proportional reductions. For example, the character 9 may indicate that an original drawing is to be reduced to one-half of the original scale, and if the photographer has a number of drawings marked for a "9" reduction, they can all be photographed without changing the location of the camera relative to the holder for the drawings. On the calculating instrument, these arbitrary characters, preferably numerals, are used for another purpose, but after one of the characters has been selected in the calculating operation, it can be used to indicate a definite reduction in the scale of the drawing and if the numbers are applied to the original drawings, all drawings bearing the same number can be easily selected by the photographer and properly photographed without changing the position of the copy holder relative to the camera.

Figure I is a top or plan view illustrating an object to be measured, and showing the calculating dividers in their primary and secondary measuring positions.

Fig. II is an enlarged transverse section illustrating the pivotal connection between the rule and one of the legs of the dividers.

Fig. III is an enlarged plan view of the connection.

Fig. I shows an object to be measured, and also illustrates the dividers in two different positions one of which may be termed a primary measuring position, and the other a secondary measuring position. The elements of the calculating dividers include a pair of legs A and B, a pivot pin C whereby said legs are pivotally connected together, and a transverse rule R spanning said legs. A′ designates an imaginary radial line drawn from the axis of the pivot C to a measuring point D at the free end of the leg A. A similar radial line B′ is actually formed on the leg B, and it may extend from the axis of the pivot C to a measuring point D at the free end of said leg B. The radial line A′ constitutes the center line of a longitudinal slot E formed in the leg A for the reception of a pivot pin F whereby the rule R is connected to the leg A. A portion of this pivot pin is preferably surrounded by an anti-friction collar G which engages the opposing longitudinal walls of the slot E, as shown most clearly in Figs. II and III. A head may be formed at the lower end of the pivot pin F (Fig. II) and the upper end may be reduced and securely riveted to the rule R. The axis of this pivot pin F lies at the center of the longitudinal slot E, and the pivot pin can, therefore, be adjusted longitudinally of the slot and in a line radial to the main pivot C whereby the legs are connected together. The rule R can be easily adjusted along the leg A, and it can also be turned on the axis of the pivot F.

The rule R is preferably provided with a longitudinal slot, and preferably graduated on opposite sides of the slot to indicate inches and agate lines, respectively, as shown most clearly in Fig. I. The legs A and B are provided with arbitrary graduations indicating various arbitrary points on the radial lines A' and B' and these graduations may be viewed through the longitudinal slot in the rule R. In the drawings, I have shown graduations in the form of numerals 1 to 16 on the legs A and B, but it is to be understood that any other suitable characters may be used to indicate various points on the radial lines, and it is not necessary for these points to be spaced in any particular manner. It is important, however, to observe that the arbitrary graduations on one leg correspond to the graduations on the other leg, and when the rule R registers with corresponding graduations, it will lie at a right angle to a radial line H drawn from the pivot C and located midway between the radial lines A' and B'. In Fig. I, the graduations 9 on the legs A and B can be seen through the slot in the rule R, and it will be apparent that the rule R can be adjusted longitudinally of the legs so as to register with other graduations along the radial lines, and whenever the rule registers with corresponding graduations on the different legs, it will lie at a right angle to the radial line H.

The rule R is used to measure distances between the radial lines A' and B' at various distances from the axis of the pivot C, and the graduations on the rule begin at the axis of the pivot F which always lies in the radial line A'.

Assuming that the drawing or other object to be reduced by photography measures 6" x 2", as shown in Fig. I, and that the length of the reduced object is to be 3 inches, the instrument can be used to determine the width of the reduced object.

This problem may be written—

6 is to 3 as 2 is to $x$.

Otherwise stated, the user knows the length and width of the original drawing and one of the dimensions of the reduced copy, and by properly using the instrument he can readily determine the other dimension of the reduced copy. The dividers are first positioned as shown at the lower portion of Fig. I, the measuring points D being spaced apart 6 inches, the length of the object to be reduced. The user knows that this 6 inch measurement is to be reduced to 3 inches, so he slides the rule R along the legs of the dividers to a position where the rule will indicate the 3 inch measurement between the radial lines A' and B'. When the rule is in this position it registers with the graduations "9" on the legs of the dividers, and it lies at a right angle to the radial line H.

The next step consists in moving the dividers to the secondary measuring position shown at the right hand side of Fig. I, moving their legs together so as to measure the 2 inch width at the points D. Although the legs are moved toward each other, the rule R must register with the graduations 9 which were selected in the first measuring operation, and said rule must also lie at a right angle to the radial line H. The operator then observes the measurement indicated by the rule, and in this case he finds it to be one inch. This measurement is the result of the calculation, and the width of the reduced copy will be 1 inch. In other words, 6 is to 3 as 2 is to 1.

No matter how complex the three given terms may be, the fourth can be readily ascertained by using the calculating instrument as herein pointed out.

During the primary measuring operation, illustrated at the lower portion of Fig. I, the rule R is positioned on the radial lines A' and B' to establish a definite proportional relation between the rule and the measuring points D, and this relation is indicated by the arbitrary character 9. Hence, whenever the rule properly registers with the characters 9, it will coöperate with the measuring points D to maintain the proportional relation as 6 is to 3. The arbitrary characters enable the rule to be properly positioned for the secondary measuring operation, and in changing from one measuring position to another, the rule must turn on the axis of its pivot F, but this does not affect the accuracy of the device, for the axis of the pivot is located on the radial line A'.

In addition to serving as a guide for positioning the rule R, the arbitrary characters can be advantageously used to indicate definite proportional reductions. For example, in the illustration herein given, the character 9 is selected during the primary measuring operation, and the same character will be selected whenever the reduction is as 6 is to 3, and if the photographer is given a number of drawings each marked for a "9" reduction, he will understand that all of these drawings can be photographed without changing the location of the copy holder relative to the camera.

I claim:

1. Calculating dividers comprising a pair of legs, a pivot connecting said legs, the free end of each leg having a measuring point in a radial line drawn from the center of the pivot, a rule-pivot adjustably mounted on one of said legs and guided in a radial line drawn from the point of the leg to the first mentioned pivot, the other leg having a longitudinal measuring line formed in alinement with its pointed end and the first mentioned pivot, a rule spanning said legs and pivotally secured at one end to said rule-pivot so that the rule can be readily adjusted longitudinally of the legs and readily turned on said rule-pivot to properly measure distances between the radial lines, and said legs being provided with corresponding oppositely disposed arbitrary graduations indicating various arbitrary points on the radial lines of the legs so that the rule can be readily positioned at a right angle to a radial line bisecting the angle between the aforesaid radial lines.

2. Calculating dividers comprising a pair of legs, a pivot connecting said legs, the free end of each leg being pointed in a radial line drawn from the center of the pivot, one of said legs being provided with a longitudinal slot formed in the radial line leading from the pivot to its pointed free end, the other leg having a longitudinal radial measuring line formed in alinement with its pointed end and the pivot, a rule-pivot adjustably mounted in said longitunal slot so that it can be adjusted in a line radial to the first mentioned pivot, a rule spanning said legs and pivotally secured at one end to said rule-pivot so that the rule can be readily adjusted longitudinally of the legs and readily positioned to measure distances between the radial lines, said rule being provided with a longitudinal slot and graduated on opposite sides of the slot to indicate inches and agate lines respectively, said legs being provided with arbitrary graduations indicating various arbitrary points on the radial lines of the legs and arranged to be viewed through the longitudinal slot in the rule, the arbitrary graduations on one leg corresponding to the arbitrary graduations on the other leg so that the rule can be readily positioned in a line at a right angle to an imaginary radial line bisecting the angle between the aforesaid radial lines.

3. Calculating dividers comprising a pair of legs, a pivot connecting said legs, the free end of each leg having a measuring point in a radial line drawn from the center of said pivot, a transverse rule mounted on one of said legs and adjustable longitudinally thereof, said pair of legs being spanned by the adjustable rule so the latter can be used to measure distances between the legs at various distances from said pivot, all of said parts being free to occupy primary measuring positions wherein the legs and rule are positioned for known proportional measurements, and also free to occupy secondary measuring positions wherein the legs are positioned for a known measurement while the rule is positioned to indicate the result of the calculation, and the legs being provided with means whereby the secondary position of the rule is indicated when the parts occupy their primary measuring positions, said means including corresponding oppositely disposed arbitrary graduations indicating various points along the legs so as to indicate the secondary position of the rule while the latter is located in its primary measuring position, and said graduations being formed to indicate different points in said radial lines, so that the rule will indicate distances from the radial line of one leg to the radial line of the other leg.

In testimony that I claim the foregoing I hereunto affix my signature.

JOSEPH W. MOONEY.

Copies of this patent may be obtained for five cents each, by addressing the "Commissioner of Patents, Washington, D. C."